United States Patent
Ikeda

(10) Patent No.: US 7,549,453 B2
(45) Date of Patent: Jun. 23, 2009

(54) METHOD FOR FORMING A GREEN TREAD RUBBER AND A PNEUMATIC TIRE FORMED BY USING GREEN TREAD RUBBER

(75) Inventor: Ikuji Ikeda, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 395 days.

(21) Appl. No.: 11/139,786

(22) Filed: May 31, 2005

(65) Prior Publication Data

US 2005/0284553 A1    Dec. 29, 2005

(30) Foreign Application Priority Data

Jun. 28, 2004   (JP) .............................. 2004-190046
Oct. 20, 2004   (JP) .............................. 2004-305565

(51) Int. Cl.
   *B60C 11/00*   (2006.01)
   *B29D 30/60*   (2006.01)
(52) U.S. Cl. .................................... 152/209.5; 156/130
(58) Field of Classification Search ................. 156/117, 156/397, 130; 152/209.5
   See application file for complete search history.

(56) References Cited

U.S. PATENT DOCUMENTS

| | | | | |
|---|---|---|---|---|
| 4,580,608 A | * | 4/1986 | Rampl | 152/209.5 |
| 5,843,249 A | * | 12/1998 | Ryba et al. | 152/209.1 |
| 2004/0055682 A1 | * | 3/2004 | Ikeda | 152/209.4 |

FOREIGN PATENT DOCUMENTS

| | | | |
|---|---|---|---|
| EP | 1 199 192 A2 | 4/2002 | |
| EP | 1 199 192 A3 | 4/2002 | |
| GB | 1 318 755 | 5/1973 | |
| JP | 54-65750 A | 5/1979 | |
| JP | 60-61312 A | * 4/1985 | ............ 152/209.12 |
| JP | 03-169719 A | * 7/1991 | ............ 152/209.12 |
| JP | 7-290595 A | 11/1995 | |
| JP | 2000-94542 A | 4/2000 | |
| JP | 2002-127718 A | 5/2002 | |

OTHER PUBLICATIONS

Machine Translation for JP 2000-94542, Apr. 2000.*

* cited by examiner

*Primary Examiner*—Geoffrey L Knable
(74) *Attorney, Agent, or Firm*—Birch, Stewart, Kolasch & Birch, LLP

(57) ABSTRACT

In a method for forming a green tread rubber comprised of a cap rubber layer which outer surface forms a tread surface and a base rubber layer that adjoins the same inside thereof in the radial direction, a cap rubber having a rubber component of styrene/butadiene rubber or being a mixed rubber of natural rubber and butadiene rubber is used as the cap rubber layer. The base rubber layer is formed as an annular body in which a strap-like rubber extruded body of wide width, which is extruded from a rubber extruder and is cut into constant size, is wound around a molding drum by a single round with their end portions in a circumferential direction being joined with each other. The cap rubber layer is formed as a strip layered body in which a long strap-like rubber strip of narrow width, which is extruded from an rubber extruder, is successively wound by overlapping the same on the annular body in the circumferential direction and in a spiral manner. A thickness T2 of the base rubber layer on a tire equator is defined to be 0.05 to 0.7 times a thickness T0 of the green tread rubber on the tire equator.

5 Claims, 5 Drawing Sheets

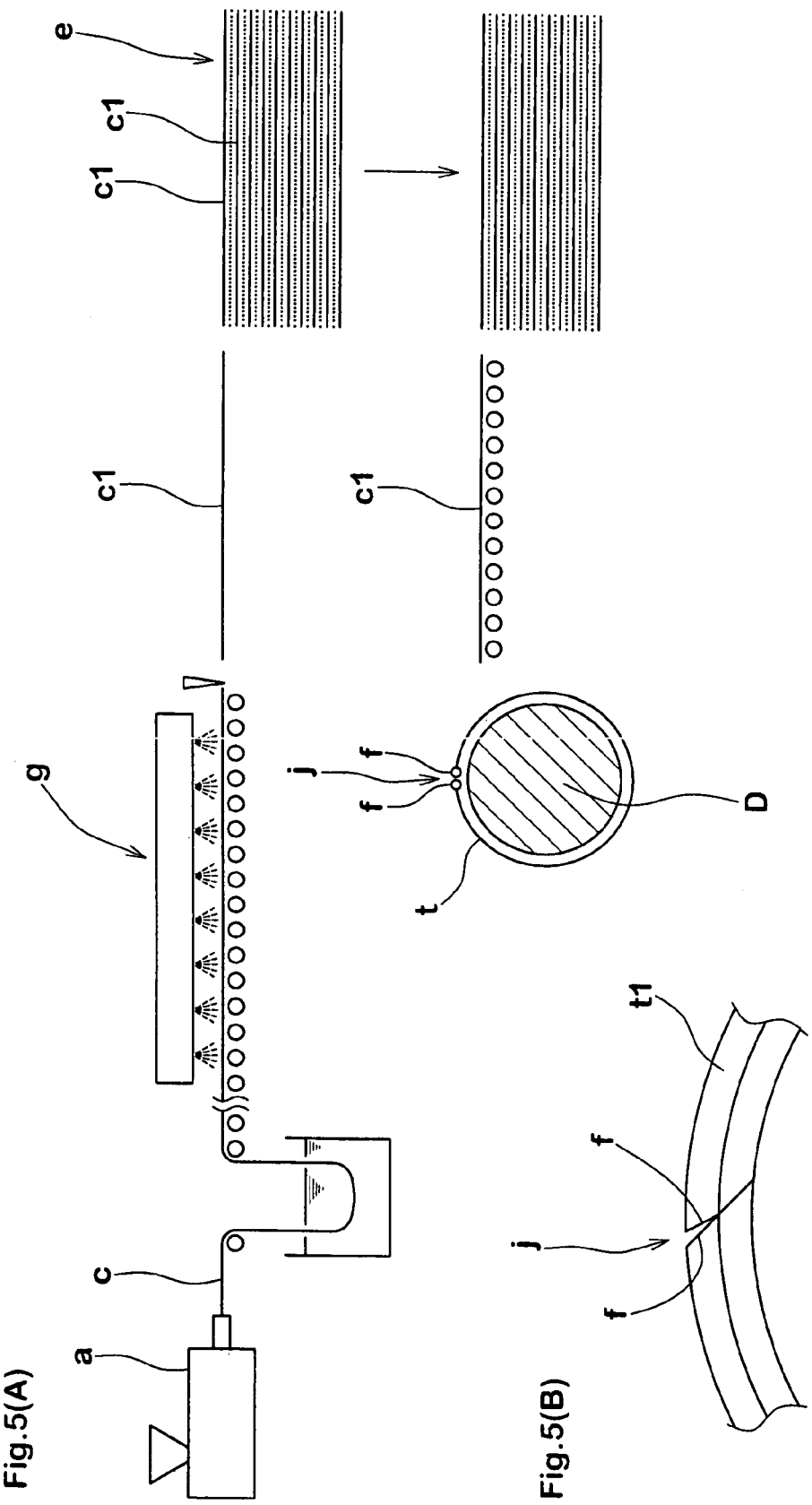

METHOD FOR FORMING A GREEN TREAD RUBBER AND A PNEUMATIC TIRE FORMED BY USING GREEN TREAD RUBBER

BACKGROUND OF THE INVENTION

The present invention relates to a method for forming a green tread rubber with which it is possible to form, at high quality, a green tread rubber of double-layered structure comprised of a base rubber layer and a cap rubber layer, and a pneumatic tire formed by using the green tread rubber.

It is common practice with pneumatic tires to employ a double-layered structure for the tread rubber comprised of an inner base rubber layer and a cap rubber layer outside thereof for improving durability, steering stability, grip performances and tire performances such as low rolling resistance.

Styrene/butadiene type rubber that exhibits superior aging resistance, heat resistance, wear resistance and wet skid resistance is employed as the cap rubber layer. On the other hand, natural rubber type rubber that exhibits repulsive elasticity and low heat-generating properties is employed as the base rubber layer.

For instance, in case of high-performance tires that exhibit superior high-speed running performances and winter tires that exhibit superior on-snow performances employ styrene/butadiene rubber as a rubber component for the cap rubber layer. With this arrangement, properties such as the above heat resistance, wear resistance and wet skid resistance are improved. In case of winter tires, mixed rubber of natural rubber and butadiene rubber exhibiting superior wear resistance and low temperature properties is employed as the rubber component of the cap rubber layer.

In this respect, it is assumable to set a complex elastic modulus $E2^*$ of the base rubber layer to be larger than a complex elastic modulus $E1^*$ of the cap rubber layer. With this arrangement, it is expected to improve the tread rigidity, to improve the steering stability when performing high-speed running or the steering stability on icy and snowy roads or when running on general roads.

On the other hand, green tread rubber prior to vulcanization molding for forming such tread rubber is conventionally manufactured in the following manner. More particularly, as illustrated in FIG. 5(A) in conceptual form, a molded body c of double-layered structure is successively extruded from a rubber extruder a. The molded body c of double-layered structure is cut into constant size to meet a peripheral length of a molding drum D. The cut rubber bodies c1 of constant size are once stored by being accumulated in a multi-staged manner on a storage carrier e. When molding a tire, the storage carrier e is transferred to a tire molding line for supplying the rubber extruded bodies c1 to the molding drum D. The rubber extruded bodies c1 are wound around the molding drum D by a single round. End portions f, f in a circumferential direction are mutually abutted and joined. With this arrangement, a green tread rubber t for green tire molding is formed in an annular shape. In this respect, reference g in the drawing denotes a cooling line.

However, in such a conventional method, adhesive force between the end portions f, f tends to fall short. Owing to this fact, an opening tends to be generated at joint portions j of the green tread rubber t in the course of manufacturing a tire. Particularly in case the base rubber is made highly elastic as in the above-described case, the adhesiveness of rubber is apt to be degraded accompanying the high elasticity. The lack in adhesiveness at the base rubber layer originates in and promotes the opening at the cap rubber layer. This accordingly leads to degradations in yield ratio and tire quality. When using styrene/butadiene rubber, such rubber itself tends to be inferior in adhesiveness when compared to natural rubber or the like, and the tendency of occurrence of opening is stronger.

Thus, when joining the end portions f, f, it might happen at the cap rubber layer t1 that the end portions f, f are not sufficiently adhered as illustrated in FIG. 5(B). It might thus happen that the joint portions j open in the course of manufacturing a tire. It might also happen that the joint portions j comprise weak points from which cracks occur. In case of styrene/butadiene type rubber, it exhibits easily shrinking properties. Dimensional changes (reductions in length) of the rubber extruded bodies c1 during storage are accordingly large, which promotes the opening or occurrence of cracks. Such opening and occurrence of cracks become particularly remarkable when the blending amount of styrene/butadiene rubber in styrene/butadiene type rubber is increased to not less than 80 parts by mass for the purpose of improving the tire performance.

The inventors of the present invention have thus suggested forming only the base rubber layer by means of a rubber extruded body from a rubber extruder while the cap rubber layer, which exhibits inferior adhesiveness, is formed through a so-called strip-wind method in which a tape-like rubber strip is overlapped and successively wound around the base rubber layer in a circumferential direction and in a spiral manner.

According to this method, it will be possible to reliably prevent opening or cracks at the cap rubber also when the blending amount of styrene/butadiene rubber is high and to improve the yield ratio and the tire quality. In the green tread rubber, the rubber composition of the cap rubber layer is changed in accordance with types of tires and other factors. The method in the prior art increased intermediate stock, since the cap rubber layer and the base rubber layer are integrally extruded whereby it will be required to change the rubber and to newly form double-layered rubber extruded bodies c1. However, according to the present invention, the cap rubber layer and the base rubber layer are separately formed so that the base rubber layer can be standardized to some extend or partially, and it will be possible to reduce the volume or types of intermediate stock, since it may be required to change rubber of, for instance, the rubber strip only.

In this respect, the inventors of the present invention have suggested, in published patent application 2002-127718, winding a soft rubber strip onto an inner layer in case of carcass rubber rather than tread rubber. However, this suggestion concerns a technique related to soft carcass rubber that is employed at carcass portions. It is accordingly assumed that a soft rubber strip having a required specified hardness, degree of tension, and Mooney viscosity is employed.

BRIEF SUMMARY OF THE INVENTION

The present invention aims to provide a method for forming a green tread rubber with which it is possible to reliably prevent opening and cracks formed in the cap rubber layer, to improve the yield ratio and tire quality, and to achieve remarkable cuts in volume and types of intermediate stocks; to provide a method for manufacturing a pneumatic tire formed by using the green tread rubber; and to provide a pneumatic tire formed by using the green tread rubber.

According to the present invention, there is provided a method for forming a green tread rubber comprised of a cap rubber layer which outer surface forms a tread surface and a base rubber layer that adjoins the same inside thereof in the radial direction, wherein a cap rubber having a rubber component of styrene/butadiene rubber or being a mixed rubber of natural rubber and butadiene rubber is used as the cap rubber layer, wherein the base rubber layer is formed as an annular body in which a strap-like rubber extruded body of wide width, which is extruded by a rubber extruder and is cut into constant size, is wound around a molding drum by a single round with their end portions in a circumferential direction being joined with each other, wherein the cap rubber layer is formed as a strip layered body in which a long strap-like rubber strip of relatively narrow width, which is extruded from an rubber extruder, is successively wound by overlapping the same on the annular body in the circumferential direction and in a spiral manner, and wherein a thickness T2 of the base rubber layer on a tire equator is defined to be 0.05 to 0.7 times a thickness T0 of the green tread rubber on the tire equator.

With this arrangement, it is possible to reliably prevent opening or cracks in the green tread rubber of double-layered structure and to improve the yield ratio and tire quality. It is also possible to achieve remarkable cuts in volumes and types of intermediate stocks.

The base rubber layer may consist of a natural rubber type rubber with natural rubber being blended d by not less than 50 parts by mass to a rubber base material, and the cap rubber layer may consist of styrene/butadiene type rubber with styrene/butadiene rubber being blended by not less than 80 parts by mass to a rubber base material.

The base rubber layer may have a rubber component that is identical to that of the cap rubber, and it is also possible to use a base rubber which complex elastic modulus E2* after vulcanization is larger than a complex elastic modulus E1* of the cap rubber after vulcanization.

In this respect, the complex elastic moduli E* are values obtained by measuring samples by using a viscoelasticity spectrometer manufactured by Iwamoto seisakusho Co., Ltd. under conditions for the temperature being 70° C., for the frequency 10 Hz, or the initial stretch strain being 10%, and for an amplitude of dynamic strain being ±2%. A rubber hardness HS is a durometer A hardness measured by using a durometer type A in conformity with JIS-K 6253.

In this context, the term "rubber components of identical type" includes a case in which rubber is made of completely identical rubber components and also a case in which monomer sequences and/or microstructures differ while chemical structure frames are identical. For instance, in case of styrene/butadiene rubber (SBR), solution polymerized SBR (S-type) and emulsion polymerized SBR (E-type) are rubber of identical type, and in case of butadiene rubber (BR), high-cis 1,4 BR and low-cis 1,4 BR are rubber of identical type.

BRIEF DESCRIPTION OF THE SEVERAL VIEWS OF THE DRAWINGS

FIG. 5(A) is a diagram for explaining a conventional method for forming a green tread rubber, and FIG. 5(B) is a sectional view of joint portions for explaining a problematic point thereof.

DESCRIPTION OF THE PREFERRED EMBODIMENTS

Figure 1:
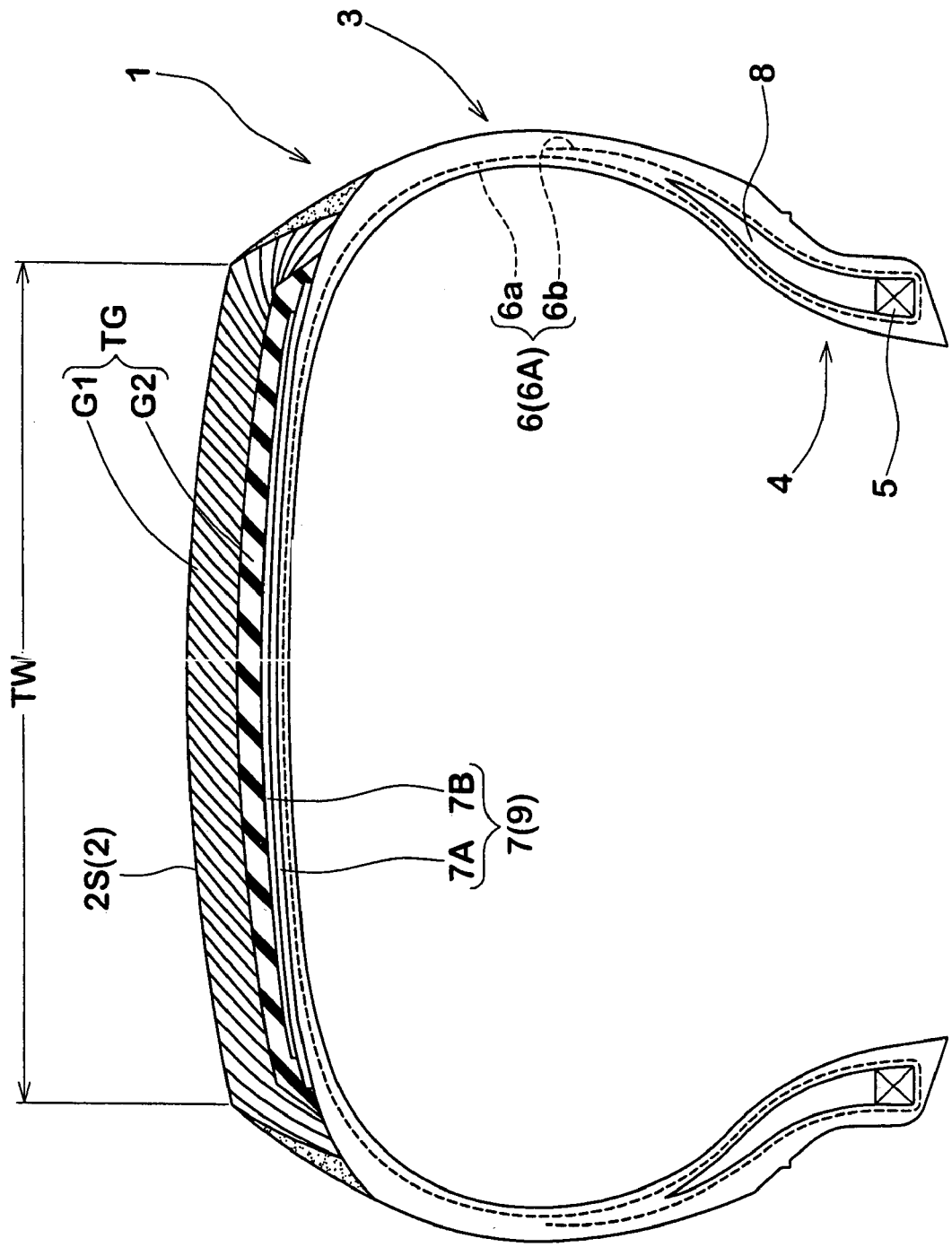
FIG. 1 is a sectional view illustrating one embodiment of a pneumatic tire employing green tread rubber formed by the forming method according to the present invention.

A first embodiment of the present invention will now be explained on the basis of illustrated examples. FIG. 1 is a sectional view illustrating a pneumatic tire employing green tread rubber as formed by the forming method according to the present invention.

In FIG. 1, the pneumatic tire 1 comprises a carcass 6 that extends from a tread portion 2 over sidewall portions 3 up to bead cores 5 of bead portions 4, and a belt layer 7 that is disposed inside of the tread portion 2 and outside of the carcass 6 in the radial direction.

The carcass 6 is comprised of at least one carcass ply (wherein one carcass ply 6A is employed in the present embodiment) in which carcass cords are aligned at angles of, for instance, 70 to 90° with respect to a tire circumferential direction, and while organic fiber cords such those made of nylon, polyester, rayon or aromatic polyamide are favorably employed as the carcass cords, it is also possible to employ metallic cords such as those made of steel. The carcass ply 6A integrally includes ply turnup portions 6b, which are turned up from inside to outside in a tire axial direction around the bead cores 5 on both sides of a ply main body portion ba that bridges between the bead cores 5, 5, and a bead apex rubber 8 for bead reinforcing purposes, which extends outside from the bead cores 5 in the tire radial direction in a tapered manner, is disposed between the ply main body portion 6a and the turnup portions 6b.

The belt layer 7 is comprised of at least two belt plies (wherein two belt plies 7A, 7B are employed in the present embodiment) in which belt cords of high strength made, for instance, steel cords, are disposed at angles of approximately 10 to 35° with respect to the tire circumferential direction, wherein the belt rigidity is improved through the belt cords intersecting with each other between the plies so that substantially the entire width of the tread portion 2 is firmly reinforced through hoop effects.

It is also possible to provide a known band layer (not shown) outside of the belt layer 7 in the radial direction in which band cords of organic fiber such as nylon are aligned at angles of not more than 5 degrees with respect to the circumferential direction for the purpose of particularly improving high-speed durability, and hereinafter, the band layer and the belt layer 7 are generally referred to as a tread reinforcing cord layer 9.

A tread rubber TG that comprises the tread portion 2 is disposed outside of the tread reinforcing cord layer 9 in the radial direction, wherein the tread rubber TG is arranged as a double-layered structure comprised of a base rubber layer G2 that adjoins the tread reinforcing cord layer 9 and a cap rubber layer G1 that adjoins the same outside in the radial direction and which outer surface comprises a tread surface 2S.

Here, styrene/butadiene type rubber (SBR type rubber), which exhibits superior aging resistance, heat resistance, wear resistance and wet skid resistance is employed as the cap rubber layer G1. The SBR type rubber is arranged in that styrene/butadiene rubber (SBR) is blended by not less than 80 parts by mass to 100 parts by mass of a rubber base material. Further, natural rubber (NR) or butadiene rubber (BR) is favorably employed as the remaining part of rubber. The SBR type rubber is capable of improving durability of the tire, wear life and gripping performances due to the above properties.

On the other hand, natural type rubber (NR type rubber) exhibiting repulsive elasticity, low heat-generating properties and adhesiveness is employed as the base rubber layer G2. The NR type rubber contains not less than 50 parts by mass, preferably not less than 60 parts by mass, and more preferably not less than 70 parts by mass of natural rubber (NR). BR is favorably employed as the remaining part of rubber. Thanks to the above properties, the NR type rubber improves steering stability, low rolling resistance and high-speed durability and also restricts separation from the tread reinforcing cord layer 9.

In this respect, the rubber hardness HS1 of the SBR type rubber after vulcanization is defined to be 50 to 80°. The rubber hardness Hs2 of the NR type rubber after vulcanization is defined to be smaller than the rubber hardness Hs1 of the SBR type rubber, and a difference |Hs1 - Hs2| is defined to be not less than 5°. This arrangement is favorable in view of simultaneous pursuit of grip performance and low rolling resistance.

A complex elastic modulus E1* of the SBR type rubber after vulcanization is defined to be 5.0 to 8.0 MPa. A complex elastic modulus E2* of the NR type rubber after vulcanization is set to be smaller than the complex elastic modulus E1* of the SBR type rubber, and a difference |E1* - E2*| is defined to be not less than 2.0 MPa. This arrangement is favorable in view of simultaneous pursuit of durability and adhesiveness.

A tangential loss tand1 of the SBR type rubber after vulcanization is set in a range of 0.10 to 0.30. A tangential loss tand2 of the NR type rubber after vulcanization is defined to be not more than 60% thereof, preferably not more than 50%, and further to be not more than 40%. With this arrangement, it will be possible to achieve simultaneously pursuit of steering stability and low rolling resistance.

It is now assumed that a green tread rubber tg (FIG. 2) for forming such as a tread rubber TG is manufactured by the above conventional method (FIG. 5(A)). In such a case, the adhesiveness of the SBR type rubber will be degraded which leads to a drop in yield ratio of products owing to openings or cracks formed at the joint portions j of the cap rubber layer G1 and to degradations in tire quality.

Figure 3:
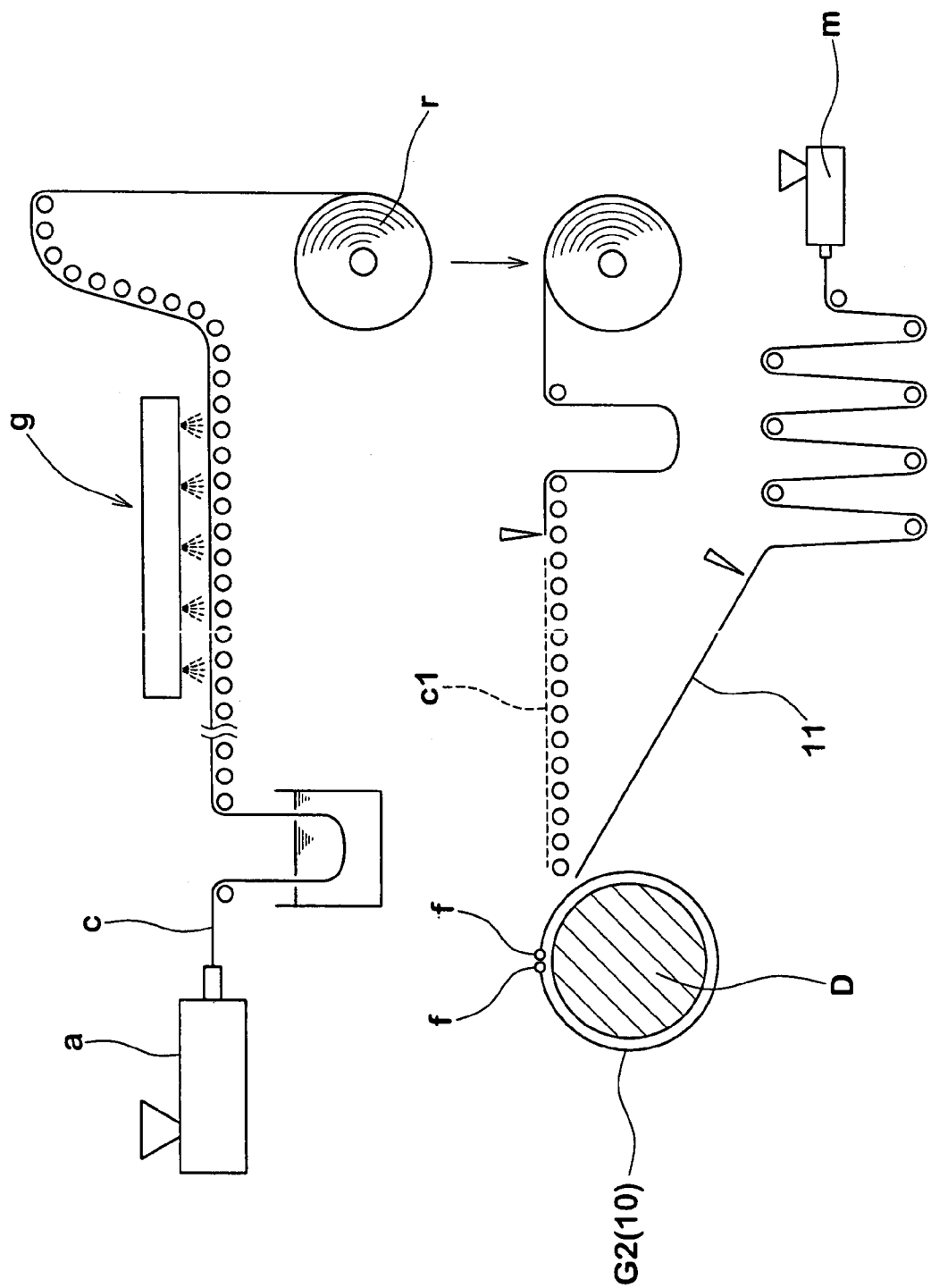
FIG. 3 is a diagram illustrating the forming method of the present invention in conceptual form.

The present invention thus forms the green tread rubber tg by the following method. More particularly, as illustrated in FIG. 3 in conceptual form, a strap-like molded body c of single-layered structure of large width that is made of a base rubber is successively extruded from a rubber extruder a. Rubber extruded bodies c1 that are obtained by cutting the molded bodies c into constant size are wound by a single round around a molding drum D on a tire molding line. Respective end portions f, f in a circumferential direction are abutted and joined whereupon the base rubber layer G2 is formed as an annular body 10. In this respect, the present embodiment illustrates a case in which the molded body c from the rubber extruder a is wound up by a reel r and is once stored as discussed above. When molding a tire, the roll-like molded body c is transferred to the tire molding line and is cut into rubber extruded bodies c1 of constant size to be supplied to the molding drum D. However, instead of storage in a roll-like manner, it is also possible to perform cutting into rubber extruded bodies c1 of constant size that are then stored by accumulating them on a storage carriage in a multi-staged manner.

Figure 2:
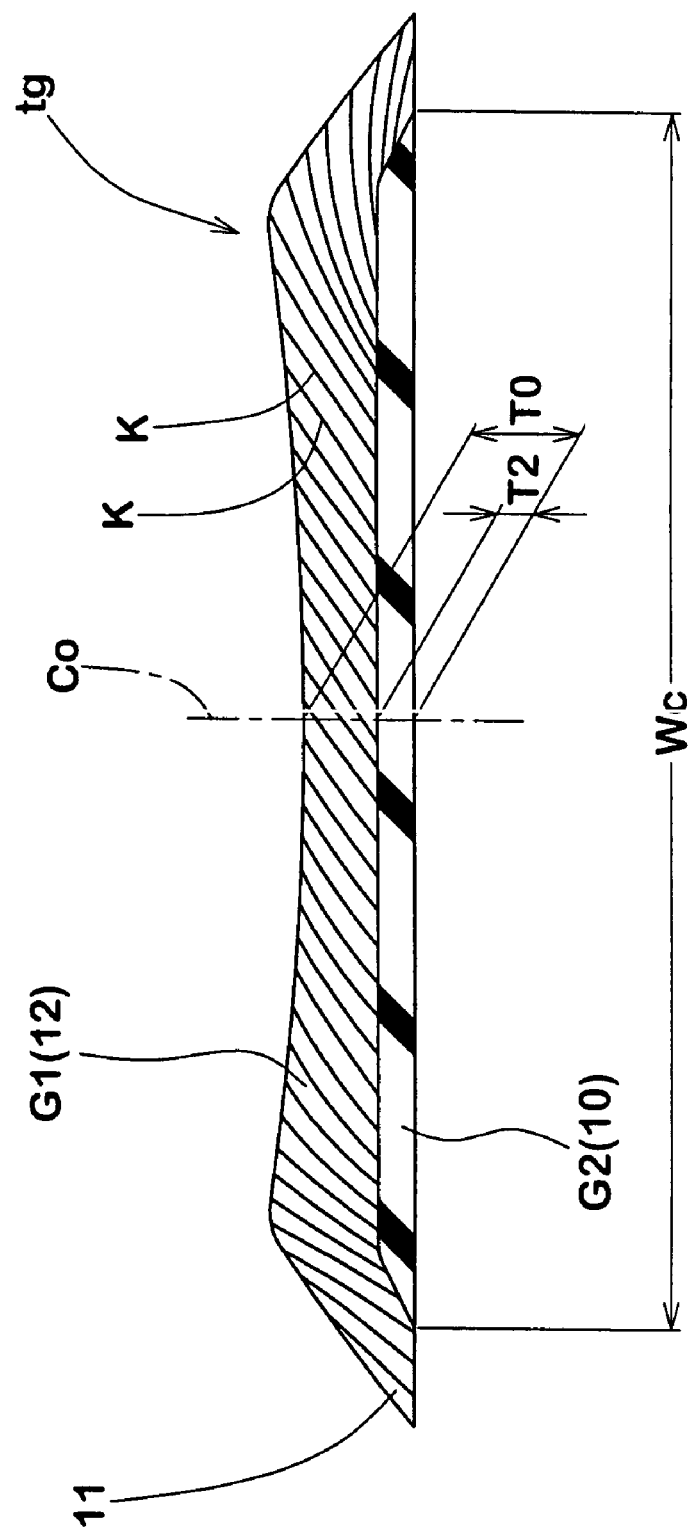
FIG. 2 is a sectional view illustrating green tread rubber employed for this purpose.

A lengthy strap-like rubber strip 11 of small width made of cap rubber extruded from a rubber extruder m is employed as the cap rubber layer G1. The rubber strip 11 is formed, as illustrated in FIG. 2, by a strip laminated body 12 that is successively wound in a circumferential direction upon overlapping them in a spiral manner on the annular body 10.

Since the rubber strip 11 is successively wound in the tire circumferential direction in such a trip laminated body 12, no joint portions directed to cross the tire axial direction will be formed in the cap rubber layer G1. Accordingly, also in case a SBR type rubber having a high blending amount of SBR of not less than 80 parts by mass is employed as the cap rubber layer G1, opening of the joint portions when molding a tire can be restricted. In this respect, joint portions (interfaces) k are formed between adjoining rubber strips 11, 11 in the tire axial direction in the strip laminated body 12. However, the joint portions will be successive in the circumferential direction. Additionally, since lateral force acting in the tire axial direction is small when compared to driving or braking force acting in the tire circumferential direction in the tread portion 2, it will be possible to secure sufficient strength.

Figure 4:
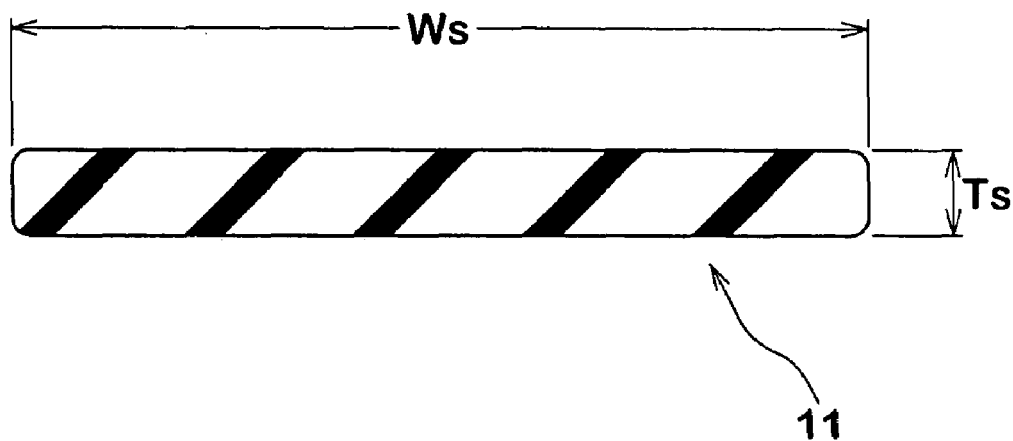
FIG. 4 is a sectional view illustrating one example of a rubber strip.

In this respect, as illustrated in FIG. 4 in sectional form, the rubber strip 11 has a strip width Ws of 5 to 30 mm and a strip thickness TS of 0.5 to 3.0 mm. Such an arrangement is convenient for obtaining a green tread rubber tg having a desired sectional shape.

In the above green tread rubber tg, a thickness T2 of the base rubber layer G2 on a tire equator co is required to be in a range of 0.05 to 0.7 times a thickness T0 of the entire green tread rubber tg on the tire equator co. When this value exceeds 0.7 times, effects of improving road surface grip properties, wear resistance and durability that are achieved by the cap rubber layer G1 tends to be lost at an early stage with the base rubber layer G2 being exposed to the tread surface at an intermediate stage of wear. When this value is less than 0.05, effects of improving low rolling resistance and steering stability owing to the base rubber layer G2 will not be sufficiently exhibited. In view of this fact, it is preferable to set a lower limit value for a ratio T2/T0 of the thickness to not less than 0.1, and further to not less than 0.15, and an upper limit value is preferably set to not more than 0.5 and further to not more than 0.3.

In the green tread rubber tg, for the purpose of enabling the molded body c (not including a cap rubber layer G1) from the rubber extruder a to be thin such that the thickness ratio T2/T0 is not more than 0.7, the molded body c may be stored in a compact roll-like manner in which it is wound up on the reel r as illustrated in FIG. 3. As a result, it will be possible to perform efficient storage by achieving cuts in storage space by, for instance, approximately 20 to 30% when compared to a conventional storage method in which storage is performed upon accumulation in a multi-staged manner. Thanks to the thin molded body c, cooling can also be easily performed so that the line length of the cooling line g can be reduced to not more than 50% of a conventional line length.

The roll-like molded body c can be sent out to the tire molding line and supplied to the molding drum D while cutting the same into rubber extruded bodies c1 of constant size. Accordingly, no dimensional changes will be generated in the rubber extruded bodies c1, and the annular body 10 (base rubber layer G2) can be formed at high accuracy. In this respect, it is also preferable to set the thickness T2 to not more than 6 mm for facilitating storage of the molded body c in a roll-like condition.

While there are cases in which the rubber composition of the cap rubber layer G1 is changed in accordance with types of tires or the like in such a green tread rubber, since the cap rubber layer G1 is formed separate from the base rubber layer G2 through a strip-wind method, it is possible to standardize the molded body c. In this case, only the rubber of the rubber strip needs to be changed, and therefore it remarkably reduces the volume and types of intermediate stock. At this time, a maximum width wc of the rubber extruded bodies c1 in the tire axial direction is preferably restricted to be not less than 0.6 times, preferably not less than 0.8 time and to not more than 1.2 times and preferably not more than 1.1 times a tread width TW of a pneumatic tire after vulcanization and molding. With this arrangement, it will be possible to achieve standardization of the molded body c with respect to tire sizes so that it is possible to achieve further reductions in intermediate stocks.

The thus obtained green tread rubber tg is assembled to a green tire in a conventionally known method, and by performing vulcanization and molding of the molded green tire, the pneumatic tire 1 as illustrated in FIG. 1 can be obtained. In this respect, since methods for forming of parts other than the green tread rubber are identical to those of the prior art, detailed explanations thereof will be omitted here.

A second embodiment in which the pneumatic tire 1 is employed as a high-performance tire oriented to high-speed running performances will now be explained. This embodiment is of course not to be limited to a high-speed running tire only. Matters other than discussed in the present embodiment are in compliance with those of the first embodiment.

The cap rubber layer G1 is formed of a cap rubber including styrene/butadiene rubber (SBR) as a rubber component that exhibits superior heat resistance, wear resistance and wet skid resistance. Owing to the above properties of the SBR, the cap rubber layer G1 improves the high-speed durability, wear life and grip performance of the tire.

The base rubber layer G2 has a rubber component, the type of which is identical to that of the cap rubber layer G1, that is, SBR. A base rubber G2 is formed of high elasticity which complex elastic modulus $E2^*$ after vulcanization is larger than a complex elastic modulus $E1^*$ of the cap rubber after vulcanization. By forming the base rubber and the cap rubber of the same type rubber components, the adhesive strength between both can be remarkably improved. Since the base rubber is made to be highly elastic, it is possible to sufficiently secure tread rigidity, to improve responsiveness and response (sense of rigidity) of the steering wheel which are strongly wanted for high-performance tires, and to improve steering stability when performing high-speed running, while exhibiting the above performances achieved by the cap rubber layer G1. On the basis of types of rubber additives that are added to the rubber components and differences in blending amounts, it is possible to provide differences of the complex elastic moduli $E1^*$, $E2^*$ of the cap rubber and the base rubber.

In case of a high-performance tire, the complex elastic modulus $E1^*$ of the cap rubber after vulcanization is preferably set in a range of 5.0 to 9.0 MPa, a rubber hardness HS1 of the cap rubber after vulcanization preferably to 60 to 90°, and a difference between the same and the rubber hardness $Hs2$ of the base rubber after vulcanization |Hs1 - Hs2| to no more than 10°.

Where the complex elastic modulus $E1^*$ is less than 5.0 MPa and the rubber hardness $Hs1$ is less than 60°, the cap rubber layer G1 itself will be too soft so that it will be difficult to achieve superior steering stability, even if the base rubber G2 is made high elastic. Where the complex elastic modulus $E1^*$ is larger than 9.0 MPa and the rubber hardness $Hs1$ is larger than 90°, the cap rubber layer G1 will be too much hardened so that grounding properties (grip performance and road following performances on the road surface) are degraded and the riding comfort is harmed. When the rubber hardness difference |Hs1 - Hs2| exceeds 10°, drawbacks will be exhibited in that worsening of so-called linearity is apt to occur in which behaviors of the vehicle when performing, for instance, lane changing during high-speed running become unstable.

A third embodiment in which the pneumatic tire 1 is favorably employed as a winter tire exhibiting superior on-snow running performances will now be explained. This embodiment is of course not to be limited to a winter tire only. Matters other than discussed in the present embodiment are in compliance with those of the first embodiment.

The cap rubber layer G1 is formed of a cap rubber including a mixed rubber of natural rubber (NR) and butadiene rubber (BR) that exhibits superior wear resistance and low-temperature properties as a rubber component. The cap rubber layer G1 is capable of improving wear life and on-snow performances (grip performances on icy and snowy road surfaces etc.) of the tire through the above properties of the mixed rubber.

The base rubber layer G2 has a rubber component, the type of which is identical to that of the cap rubber layer G1. That is, the rubber component is formed of the mixed rubber, in the present embodiment. A base rubber is of high elasticity which complex elastic modulus $E2^*$ after vulcanization is larger than a complex elastic modulus $E1^*$ of the cap rubber after vulcanization. By forming the base rubber and the cap rubber of the same type of the rubber components, the adhesive strength between both can be improved. Since the base rubber is made to be highly elastic, it is possible to sufficiently secure tread rigidity while exhibiting the performances of the cap rubber layer G1. Accordingly, also in case the cap rubber is made to be soft for achieving on-snow grip performances, it is possible to maintain steering stability in that the handle responsiveness and response (sense of rigidity) required for running on general road surfaces can be sufficiently secured.

In this respect, the mixed rubber is arranged in that 30 to 70 parts by mass of natural rubber and 70 to 30 parts by mass of butadiene rubber are blended within 100 parts by mass of rubber components, and the ratio between the natural rubber and butadiene rubber can be varied within this range.

Here, in case of a winter tire, the complex elastic modulus $E1^*$ of the cap rubber after vulcanization is preferably in the range of 2.0 to 5.0 MPa, the rubber hardness $Hs1$ of the cap rubber after vulcanization is preferably in the range of 40 to 60°, and the rubber hardness $Hs2$ of the base member is larger than the rubber hardness $Hs1$.

Where the complex elastic modulus $E1^*$ is less than 2.0 MPa and the rubber hardness HS1 is less than 40°, the cap rubber layer G1 itself will be too soft so that it will be difficult to achieve steering stability required for running on general road surfaces however highly elastic the base rubber is made. Where the complex elastic modulus $E1^*$ is larger than 5.0 MPa, the rubber hardness $Hs1$ is larger than 60°, and $Hs1 > Hs2$, the cap rubber layer G1 will be too much hardened, and on-snow performances cannot be exhibited owing to, for instance, degraded on-snow grip performances.

In the second and third embodiments, the base rubber layer G2 and the cap rubber layer G1 employ rubber of the same type of rubber components. The adhesiveness between both layers will thus be improved. Force of restricting movements of the end portions of the base rubber layer G2 will thus strongly act such that effects of restricting opening can be further improved.

In these alternative embodiments, the thickness T2 of the base rubber layer G2 on the tire equator co is required to be in the range of 0.05 to 0.7 times the thickness T0 of the entire green tread rubber tg on the tire equator co. An upper limit thereof is preferably set to not more than 0.6.

While preferred embodiments of the present invention have been explained so far in details, the present invention is not limited to the illustrated embodiments alone but may be embodied upon modifying the same into various forms.

EXAMPLES

Pneumatic tires (Embodiment 1) having a tire size of 205/65R15 were manufactured by using the green tread rubber formed by the method for forming according to the present invention, and features such as presence/absence of occurrence of opening or cracks in the tread rubber, the quality of the sample tires and the productivity thereof in manufacturing were compared to those of comparative Examples 1A, 1B.

Investments, facility spaces, intermediate stock (storage) spaces and expected amounts of intermediate stocks required for establishing a green tread rubber forming line (FIG. 3) in which the method for forming of the present invention can be performed were compared to those of the comparative Examples 1A, 1B.

In this respect, in the comparative Example 1, a double-layered molded body c from the rubber extruder a was cut into constant size, and the cut rubber bodies c1 of constant size were stored as intermediate stocks by accumulating the same one on a storage carriage e in a multi-staged manner. The storage carriage e was transferred to the tire molding line, and the rubber extruded bodies c1 were wound by a single round around the molding drum D to form the green tread rubber in an annular manner. In the comparative Example 2, both of the base rubber layer and the cap rubber layer were formed as laminated bodies of a rubber strip using a strip-wind method.

(1) Occurrence of Openings or Similar:

Rates of occurrence of opening and cracks of the tread rubber when manufacturing tires were calculated.

(2) Quality:

RFV of the sample tires were measured in conformity with the uniformity testing method for vehicles according to JASO c607 by using a uniformity tester, and reciprocals of average values of 100 tires were indicated as indices with that of the comparative Example 1 being defined as 100. The larger the indices were, the more favorable they were.

(3) Investments, Facility Spaces, Intermediate Stock (Storage) Spaces and Amounts of Intermediate Stocks:

A green tread rubber forming line capable of producing two types of tires at a ratio of 100 tires per 12 hours each was assumed, and investments, facility spaces, intermediate stock (storage) spaces and amounts of intermediate stocks were indicated as indices with that of the comparative Example 1 being 100. The smaller the indices were, the more favorable they were.

TABLE 1

|  | Example 1 | Comparative Example 1A | Comparative Example 1B |
|---|---|---|---|
| Cap rubber layer | Rubber strip | Rubber extruded body (Integrated body) | Rubber strip |
| Base rubber layer | Rubber extruded body |  | Rubber strip |
| Occurrence of opening | 0 | 5 | 0 |
| Quality | 145 | 100 | 150 |
| Productivity | 140 | 100 | 95 |
| Investment | 80 | 100 | 105 |
| Facility space | 50 | 100 | 45 |
| Intermediate stock space | 20 | 100 | 15 |
| Intermediate stock amount | 35 | 100 | 30 |

Alternative Example

Green tread rubber formed by the second and third embodiments were employed for forming a high-performance tire having a tire size of 215/45R17 (Embodiment 2) and a studless tire having a tire size of 205/65R15 (Embodiment 3), and features such as presence/absence of occurrence of opening or cracks in the tread rubber and the productivity thereof in manufacturing were compared to those of comparative Examples 2A, 2B, 3A and 3B.

Investments, facility spaces, intermediate stock (storage) spaces and expected amounts of intermediate stocks required for establishing a green tread rubber forming line (FIG. 3) in which the method for forming of the present invention can be performed were compared to those of the comparative Examples 2A, 2B, 3A and 3B.

In this respect, in the comparative Examples 2A and 3A, a double-layered molded body c from the rubber extruder a was cut into constant size, and the cut rubber bodies c1 were stored as intermediate stocks by accumulating the same one on a storage carriage e in a multi-staged manner as illustrated in FIG. 5. The storage carriage e was transferred to the tire molding line, and the rubber extruded bodies c1 were wound by a single round around the molding drum D to form the green tread rubber in an annular manner. In the comparative Examples 2B and 3B, both of the base rubber layer and the cap rubber layer were formed as laminated bodies of a rubber strip using a strip-wind method.

(1) Occurrence of Openings or Similar:

Rates of occurrence of opening and cracks of the tread rubber when manufacturing tires were calculated.

(2) Investments, Facility Spaces, Intermediate Stock (Storage) Spaces and Amounts of Intermediate Stocks:

A green tread rubber forming line capable of producing two types of tires at a ratio of 100 tires per 12 hours each was assume, and investments, facility spaces, intermediate stock (storage) spaces and amounts of intermediate stocks were indicated as indices with that of the comparative Examples 2A and 3A being 100. The smaller the indices were, the more favorable they were.

TABLE 2

|  | Comparative Example 2A | Comparative Example 2B | Example 2 | Comparative Example 3A | Comparative Example 3B | Example 3 |
|---|---|---|---|---|---|---|
| Cap rubber layer | Rubber extruded body | Rubber strip | Rubber strip | Rubber extruded body | Rubber strip | Rubber strip |
| Rubber component | SBR | SBR | SBR | NR + BR | NR + BR | NR + BR |
| Complex elastic modulus $E1^*$ <MPa> | 7.5 | 7.5 | 7.5 | 4.0 | 4.0 | 4.0 |

TABLE 2-continued

|  | Comparative Example 2A | Comparative Example 2B | Example 2 | Comparative Example 3A | Comparative Example 3B | Example 3 |
|---|---|---|---|---|---|---|
| Rubber hardness Hs1 <degrees> | 68 | 68 | 68 | 46 | 46 | 46 |
| Base rubber layer | Rubber extruded body | Rubber strip | Rubber extruded body | Rubber extruded body | Rubber strip | Rubber extruded body |
| Rubber component | SBR | SBR | SBR | NR + BR | NR + BR | NR + BR |
| Complex elastic modulus E2* <MPa> | 8.0 | 8.0 | 8.0 | 5.1 | 5.1 | 5.1 |
| Rubber hardness Hs2 <degrees> | 70 | 70 | 70 | 50 | 50 | 50 |
| Rate of occurrence of opening or similar <%> | 3 | 0 | 0 | 4 | 0 | 0 |
| Productivity | 100 | 90 | 140 | 100 | 95 | 140 |
| Investment | 100 | 105 | 80 | 100 | 105 | 80 |
| Facility space | 100 | 45 | 50 | 100 | 45 | 50 |
| Intermediate stock space | 100 | 15 | 20 | 100 | 15 | 20 |
| Intermediate stock amount | 100 | 30 | 35 | 100 | 30 | 35 |

What is claimed is:

1. A method for forming a green tread rubber, the green tread rubber composed of a cap rubber layer of which outer surface forms a tread surface and a base rubber layer that adjoins the radially inside of the cap rubber layer, wherein the base rubber layer is made of a base rubber, and the cap rubber layer is made of a cap rubber, the method comprising the steps of:

forming an annular base rubber layer by winding a strap-like base rubber one turn around a molding drum and jointing the circumferential end portions thereof with each other, wherein the strap-like base rubber is extruded from a rubber extruder and is cut into a certain length; and forming the cap rubber layer by successively winding and overlapping a long strip of the cap rubber in the circumferential direction and in a spiral manner on the annular base rubber layer, wherein the long strip is extruded from a rubber extruder and has a smaller width than that of the strap-like base layer, wherein a thickness T2 of the base rubber layer is 0.05 to 0.7 times a thickness T0 of the green tread rubber measured at the tire equator, the rubber component of the cap rubber comprises not less than 80 parts by mass of a styrene/butadiene rubber per 100 parts by mass of the rubber base material, and the complex elastic modulus $E1^*$ thereof after vulcanization is 5.0 to 8.0 MPa, and the rubber component of the base rubber comprises not less than 50 parts by mass of a natural rubber per 100 parts by mass of the rubber base material, and the complex elastic modulus $E2^*$ thereof after vulcanization is smaller than said complex elastic modulus $E1^*$ and the difference $|E1^*-E2^*|$ therebetween is not less than 2.0 MPa.

2. The method as claimed in claim 1, wherein the cap rubber strip has a width of 5 to 30 mm and a thickness of 0.5 to 3.0mm.

3. The method as claimed in claim 1, wherein a hardness Hs1 of the styrene/butadiene type cap rubber after vulcanization is 50 to 80 degrees while a hardness Hs2 of the natural rubber type base rubber after vulcanization is smaller than the cap rubber hardness Hs1 and the difference |Hs1 - Hs2| therebetween is not less than 5 degrees.

4. The method as claimed in claim 2, wherein a hardness Hs1 of the styrene/butadiene type cap rubber after vulcanization is 50 to 80 degrees while a hardness Hs2 of the natural rubber type base rubber after vulcanization is smaller than the cap rubber hardness Hs1 and the difference |Hs1 - Hs2| there between is not less than 5 degrees.

5. A pneumatic tire formed by using the green tread rubber obtained through the method as claimed in claim 1, 2, 3 or 4.

* * * * *